2,723,758

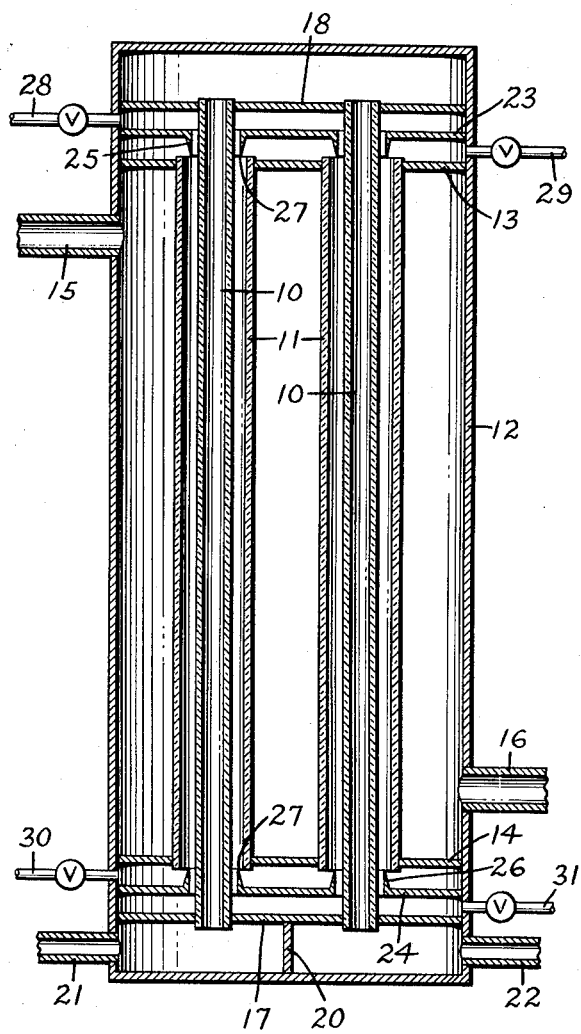
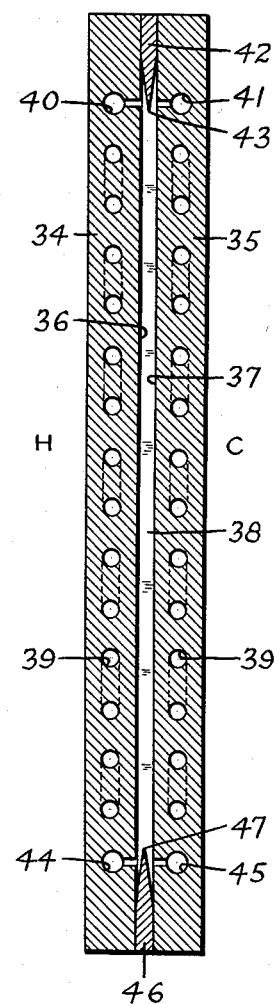

THERMAL DIFFUSION APPARATUS

George L. Lupfer, Bedford, and Ralph G. Atkinson, Maple Heights, Ohio, assignors to The Standard Oil Company, Cleveland, Ohio, a corporation of Ohio Application January 24, 1952, Serial No. 268,094

9 Claims. (Cl. 210—52.5)

The present invention relates to novel thermal diffusion apparatus and to a method of subjecting liquid mixtures to continuous thermal diffusion.

The thermal diffusion of a liquid mixture, a term intended herein to include mixtures and solutions liquid under operating conditions, consists essentially of subjecting a thin film of liquid mixture to a temperature gradient across the film. This is ordinarily accomplished by passing the liquid mixture through a space defined in part by two closely spaced mutually parallel walls, which may, for example, be flat or concentric, one of the walls being maintained at a higher temperature than the other. In methods and apparatus hitherto proposed for subjecting liquid mixtures to continuous thermal diffusion, it has been the practice to introduce the liquid mixture into a column having a slit width of the order of about 0.01 to about 0.15 inches and to withdraw dissimilar fractions, a term intended herein to refer to the products of thermal diffusion that are enriched or impoverished, as the case may be, in one or more of the components of the initial liquid mixture.

Generally the apparatus of this invention comprises two substantially vertical liquid impervious walls substantially equidistantly spaced from one another to form a narrow slit, means for relatively heating and cooling the walls to maintain a temperature gradient across the slit, inlet ports at one or both the upper and lower ends of the slit and withdrawal ports at both the upper and lower ends of the slit. In the preferred embodiments of the apparatus, liquid flow-directing means are provided between inlet and withdrawal ports at the same end of the slit to direct the flow of liquid mixture introduced into the slit along one of the walls thereof. Thus, for example, an inlet port at the lower end of the slit is provided with means directing the flow of liquid mixture upwardly along the relatively heated wall and an inlet port at the upper end of the slit is provided with means for directing the flow of liquid mixture downwardly along the relatively cooled wall.

It is to be understood that the terms "hot" and "cold," and "relatively heated," "relatively cooled," "relatively heating" and "relatively cooling," are used in their relative, rather than their absolute sense.

The slit forming walls in the apparatus of this invention may be tubular, flat or any desired shape. It is important, however, that the walls be substantially equidistantly spaced from one another to form a narrow, uniform slit having a width of less than about 0.15" and preferably of the order of about 0.02" to about 0.06".

In the tubular type of apparatus, one preferred embodiment of which will be described with reference to the accompanying drawing, it is particularly desirable to mount a plurality of sets of concentric tubes, each set consisting of an inner tube and an outer tube, the outer and inner walls, respectively, of which form an annular slit, in a suitable housing in such manner that a fluid heat transfer medium can be brought into intimate contact with all of the outer tubes and another heat transfer medium can be passed through the inner tubes to maintain a temperature gradient across the annular slits.

In this embodiment, the inner tubes are preferably of greater length than the outer tubes and extend beyond at least one of the ends of the outer tube. A perforated baffle plate is supported between at least one of the corresponding ends of the inner and outer tube, the perforations in the plate being concentric with the inner tube and of a size intermediate the areas defined by the inner periphery of the outer tube and the outer periphery of the inner tube. If desired, the plate may be provided with sleeve members, preferably terminating in knife edges which extend substantially to the adjacent ends of the slits. Ports are provided to communicate with the space or spaces between the perforated plate and the projecting ends of the inner tubes and with the space between the baffle plate and the corresponding ends of the outer tubes.

Generally, the method of this invention comprises continuously introducing a liquid mixture into a vertical thermal diffusion slit at one or both the upper and lower ends and withdrawing the dissimilar fractions from both the upper and lower ends of the column. In the preferred embodiment of the method of this invention, the liquid mixture introduced at either or both the upper and lower ends is directed to flow along a preselected wall forming the thermal diffusion slit. Thus, for example, liquid mixture introduced at the upper end of the slit is directed to flow downwardly along the cold or relatively cooled wall, and liquid mixture introduced at the lower end of the slit is directed to flow upwardly along the hot or relatively heated wall.

The apparatus and method of the invention, and the utility and advantages thereof will become further apparent from the following detailed description made with reference to the accompanying drawing, wherein:

Figure 1 is a diagrammatic illustration of a concentric tube type apparatus embodying the features of the invention; and Figure 2 is a diagrammatic illustration of a flat plate type apparatus.

Referring now to Figure 1 of the drawing, a plurality of inner tubes 10, concentrically arranged with an equal number of outer tubes 11, are supported in any suitable manner within a shell 12. The outer tubes 11, for example, may be supported by plates 13 and 14, a space being formed between these plates for the circulation of a heating or cooling medium, entrances and exits for which may be provided, for example, at 15 and 16. The inner tubes 10 may be spaced and supported on a plate 17 at the lower end and spaced and supported at the upper end by a similar plate 18, the spacings between the outer surfaces of inner tubes 10 and the inner surfaces of outer tubes 11 forming vertical, annular slits having a width less than about 0.15" and preferably within the range of about 0.02" to about 0.06". The space between plate 17 and the bottom of the shell 12 is divided by a divider 20 and provided with inlet and outlet openings 21 and 22 for the entry and exit of a cooling or heating medium.

Between plates 13 and 18 on the one hand, and plates 14 and 17 on the other, there are provided liquid flow-directing means such as perforated baffle plates 23 and 24, respectively, having holes intermediate in diameter in relation to the outer and inner diameters of the inner and outer tubes 10 and 11, so that the inner tubes 10 may pass through the holes in the plates 23 and 24, leaving annular spaces between the plates 23 and 24 and tubes 10 having areas less than the area of the annular spaces between the tubes 10 and 11. For optimum efficiency, the liquid-directing means include, as shown, sleeve members 25 and 26 having knife edges 27 and extending to the respective ends of the annular slits formed by tubes 10 and 11. Ports communicating with the annular slits formed by the concentrically arranged tubes 10 and 11 are provided at 28, 29, 30 and 31.

A temperature gradient may be maintained across the slits formed as illustrated in Figure 1 in a number of different ways. Thus it is possible to heat the outer tubes 11 by the circulation of a heating medium around the tubes and introducing and withdrawing the heating medium by way of ports 15 and 16. The inner tubes 10 may be cooled by circulating a cooling medium through the tubes by way of ports 21 and 22. On the other hand, it is equally possible to heat the inner tubes 10 by circulating a heating medium therethrough and to cool the outer tubes 11 by introducing and withdrawing a cooling medium by way of ports 15 and 16.

Several variations in flow pattern of the liquid mixture are possible when the outer tubes 11 are heated and the inner tubes 10 are cooled.

In one such procedure the liquid mixture is introduced by way of port 28 and the baffle effect of plate 23, supplemented by the depending sleeve members 25, forms descending films of the liquid mixture around the cold inner tubes 10. As the film becomes subject to the thermal diffusive forces set up by the temperature difference between the outer walls of the inner tubes 10 and the inner walls of the outer tubes 11, the dissimilar components thereof become concentrated adjacent the respective hot and cold walls. The difference in density of the liquid fractions, due at least partly to the relative cooling of the fraction adjacent the cold wall and the relative heating of the fraction adjacent the hot wall, induces a thermal circulation which results in an upward movement of the fraction concentrated adjacent the hot wall and a downward movement of the fraction concentrated adjacent the cold wall. The upwardly moving fraction is withdrawn by way of port 29 and the descending fraction adjacent the cold wall is withdrawn by way of port 31, port 30 being closed or eliminated and baffle plate 24 and associated sleeve members 26 being eliminated if desired.

With the outer tubes heated and the inner tubes cooled, it is also possible to feed the liquid mixture at the lower end only. The liquid mixture is introduced by way of port 30 and directed, by means of baffle plate 24 and the upstanding sleeve members 26, to flow upwardly along the hot inner surface of the outer tubes 11. The fraction concentrated by the thermal diffusive forces adjacent the cold walls is withdrawn by way of port 31 and the fraction concentrated adjacent the hot walls is withdrawn by way of port 29, the port 28 being closed or eliminated and the baffle plate 23 and depending sleeve members 25 being eliminated if desired.

With the outer tubes heated and the inner tubes cooled, it is also possible to introduce the liquid mixture simultaneously at the upper and lower ends of the thermal diffusion columns by way of ports 28 and 30. The feed introduced by the top forms annular films around the inner tubes 10 under the flow directing influence of the upper baffle plate 23 and depending sleeve members 25. The feed introduced by way of port 30 forms ascending annular films adjacent the interior of the outer tubes 11 under the flow directing influence of the lower baffle plate 24 and upstanding sleeve members 26. The hot fraction ascending adjacent the hot walls is withdrawn by way of port 29 and the fraction descending adjacent the cold walls is withdrawn by way of port 31.

When the outer tubes 11 are cooled and the inner tubes 10 are heated there are also several variations in the manner in which the apparatus of this invention can be utilized.

In one such variation, the liquid mixture is introduced by way of port 29 and the baffle effect of plate 23, supplemented by the depending sleeve members 25, forms descending annular films of the liquid mixture adjacent the inner walls of the outer tubes 11. The thermal diffusive forces resolve the mixture into two dissimilar fractions, one of which becomes concentrated adjacent the cold wall and descends along the inner surfaces of the outer tubes 11 to be withdrawn by way of port 30, port 31 being closed or eliminated and baffle plate 24 and upstanding sleeve members 26 being eliminated if desired. The other fraction, which becomes concentrated adjacent the hot wall and ascends along the outer surfaces of the inner tubes 10, is withdrawn by way of port 28.

With the inner tubes heated and the outer tubes cooled, it is also possible to feed the liquid mixture at the lower end only. The liquid mixture is introduced by way of port 31 and directed by means of baffle plate 24 and the upstanding sleeve members 26 to flow upwardly along the hot outer surfaces of the inner tubes 10. The fraction concentrated by the thermal diffusive forces adjacent the cold walls is withdrawn by way of port 30 and the fraction concentrated adjacent the hot walls is withdrawn by way of port 28, the port 29 being closed or eliminated and the baffle plate 23 and depending sleeve members 25 being eliminated if desired.

With the inner tubes heated and the outer tubes cooled, it is also possible to introduce the liquid mixture simultaneously at the upper and lower ends of the thermal diffusion columns by way of ports 29 and 31. The liquid mixture introduced at the top by way of port 29 is directed, by means of baffle plate 23 and depending sleeve members 25, to flow downwardly along the cold inner walls of the outer tubes 11, and the liquid mixture introduced at the bottom, by way of port 31, is directed, by means of baffle plate 24 and upstanding sleeve members 26, to flow upwardly along the hot outer surfaces of the inner tubes 10. The thermal diffusive forces concentrate dissimilar fractions adjacent the hot and cold walls, respectively, and the fractions formed thereby are induced, wholly or partly by thermal circulation, to ascend along the outer hot walls of the inner tubes 10 and descend along the inner cold walls of the outer tubes 11. The fraction adjacent the hot walls of the inner tubes 10 is withdrawn by way of port 28 and the fraction descending along the cold walls of the outer tubes 11 is withdrawn by way of port 30.

Referring now to Figure 2 of the drawing, a flat plate type apparatus comprises vertical walls 34 and 35 closely and substantially equidistantly spaced from one another so that their opposed faces 36 and 37 form a narrow vertical slit 38 having a width of less than about 0.15" and preferably within the range of about 0.02" to about 0.06". Means, such as coils indicated at 39, are provided to maintain the walls 34 and 35 at different temperatures and thus maintain a temperature gradient across the slit 38. At the upper end of the slit 38, two oppositely disposed ports 40 and 41 are provided, as well as a baffle plate 42 extending between the opposed ports 40 and 41 and preferably having a knife edge 43. Similarly, at the lower end of the slit there are provided two opposed ports 44 and 45, as well as a baffle plate 46 extending between the opposed ports 44 and 45 and preferably terminating in a knife edge 47.

The apparatus illustrated in Figure 2 may be operated in a number of different ways. Thus if the wall 34 is relatively heated and the wall 35 is relatively cooled, liquid mixture may be introduced only by way of port 44 and dissimilar fractions withdrawn by way of port 45 and either or both ports 40 and 41, liquid mixture may be introduced only by way of port 41 and the resulting dissimilar fractions be withdrawn by way of ports 40 and one or both of ports 44 and 45, or liquid mixture may be introduced by way of both ports 41 and 44 and dissimilar fractions be withdrawn by way of ports 40 and 45. In each of these variations in flow pattern, it is apparent that the liquid mixture is directed to flow either upwardly along the relatively heated wall 34, downwardly along the relatively cooled wall 35, or both. The dissimilar fraction which concentrates adjacent the hot wall 34 and ascends along said wall is in each instance withdrawn by port 40, substantial intermixing thereof with liquid mixture introduced by way of port 41 being avoided by means of baffle 42, and the dissimilar fraction concentrating adjacent the cold wall 35 descends along said wall, to be withdrawn by way of port 45, intermixing thereof with liquid feed introduced by way of port 44 being avoided by means of the baffle 46.

Either in addition to or in place of the liquid flow-directing means described with specific reference to the accompanying drawing, it is also within the scope of the invention to direct the flow of liquid mixture by adjustment of its initial temperature relative to the temperatures within the thermal diffusion slit. Thus, for example, in instances where it is desired to introduce liquid mixture at the upper end of the slit and to direct its flow downwardly adjacent the relatively cooled wall, such direction can be promoted by adjusting the temperature of the liquid mixture to a temperature that is less than the mean temperature within the slit. Likewise, if the liquid mixture is to be introduced at the lower end of the slit and directed to flow upwardly along the relatively heated wall, such direction can be promoted by adjusting the temperature of the liquid mixture to one that is higher than the mean temperature within the slit.

It is to be understood that it is within the contemplation of the invention to utilize means other than temperature adjustment of the liquid mixture in order to induce it to enter the thermal diffusion column or columns in the desired manner. Thus, for example, it is within the contemplation of the invention to utilize a comparatively heavy diluent for the liquid mixture introduced into the column at the top. Similarly, it is possible to dilute the liquid mixture with a comparatively light diluent and introduce the diluted liquid mixture into the lower end of the thermal diffusion column.

Further modifications and changes will readily become apparent to those skilled in the art upon reading this description. All such modifications and changes are intended to be included within the scope of the invention, as defined in the following claims.

We claim:

1. Liquid thermal diffusion apparatus comprising two substantially vertical, liquid impervious walls substantially equidistantly spaced from one another to form a narrow vertical slit, means for relatively heating and cooling the walls to maintain a temperature gradient across the slit, inlets at both the upper and lower ends of the slit, outlets at both the upper and lower ends of the slit, first liquid flow-directing means between the inlet and outlet at the upper end of the slit for directing the flow of liquid mixture introduced into the slit through said upper inlet downwardly along the relatively cooled wall of the slit, and second liquid flow-directing means between the inlet and outlet at the lower end of the slit for directing the flow of liquid mixture introduced into the slit through said lower inlet upwardly along the relatively heated wall of the slit.

2. Liquid thermal diffusion apparatus as defined in claim 1, wherein the slit forming walls are concentric tubes.

3. Liquid thermal diffusion apparatus as defined in claim 1, wherein the slit forming walls are flat plates.

4. Liquid thermal diffusion apparatus comprising two substantially vertical and concentric tubes, the outer periphery of the inner tube being substantially equidistantly spaced from the inner periphery of the outer tube to form a narrow annular slit between the tubes, at least one end of the inner tube projecting beyond the corresponding end of the outer tube, means for relatively heating and cooling the tubes to maintain a temperature gradient across the slit, a perforated baffle plate substantially perpendicular to the tubes and supported between one of the corresponding ends of the tubes, the perforation in said plate being concentric with the inner tube and of a size intermediate the areas defined by the inner periphery of the outer tube and the outer periphery of the inner tube, a sleeve member extending from the perforated baffle plate to the annular slit, said sleeve member forming a first port communicating with the space between said perforated plate and the projecting end of the inner tube and a second port communicating with the space between the baffle plate and the corresponding end of the outer tube, and an outlet communicating with the slit at the other end of said tubes.

5. Liquid thermal diffusion apparatus comprising two substantially vertical and concentric tubes, the outer periphery of the inner tube being substantially equidistantly spaced from the inner periphery of the outer tube to form a narrow annular slit between the tubes, both the upper and lower ends of the inner tube projecting beyond the corresponding ends of the outer tube, means for relatively heating and cooling the tubes to maintain a temperature gradient across the slit, upper and lower perforated baffle plates substantially perpendicular to the tubes, one of the plates being supported between each of the corresponding upper and lower ends of the tubes, the perforations in said plates being concentric with the inner tube and of a size intermediate the areas defined by the inner periphery of the outer tube and the outer periphery of the inner tube, and sleeve members extending from the perforated baffle plates to the annular slit, said sleeve members forming a first port communicating with the space between the upper perforated plate and the upper projecting end of the inner tube, a second port communicating with the space between the upper baffle plate and the corresponding end of the outer tube, a third port communicating with the space between the lower perforated plate and the lower projecting end of the inner tube, and a fourth port communicating with the space between the lower plate and the corresponding end of the outer tube.

6. Liquid thermal diffusion apparatus comprising two substantially vertical and concentric tubes, the outer periphery of the inner tube being substantially equidistantly spaced from the inner periphery of the outer tube to form a narrow annular slit between the tubes, both the upper and lower ends of the inner tube projecting beyond the corresponding ends of the outer tube, means for bringing a first heat transfer fluid into contact with the outer surface of the outer tube, and means for bringing a second heat transfer fluid into contact with the inner wall of the inner tube to maintain a temperature gradient across the annular slit, upper and lower perforated baffle plates substantially perpendicular to the tubes, one of the plates being supported between each of the corresponding upper and lower ends of the tubes, the perforations in said plates being concentric with the inner tube and of a size intermediate the areas defined by the inner periphery of the outer tube and the outer periphery of the inner tube, and sleeve members extending from the perforated baffle plates to the annular slit, said sleeve members forming a first port communicating with the space between the upper perforated plate and the upper projecting end of the inner tube, a second port communicating with the space between the upper baffle plate and the corresponding end of the outer tube, a third port communicating with the space between the lower perforated plate and the lower projecting end of the inner tube, and a fourth port communicating with the space between the lower plate and the corresponding end of the outer tube.

7. A liquid thermal diffusion apparatus comprising a plurality of pairs of substantially vertical inner and outer concentric tubes, the tubes of each pair having opposed walls forming a narrow annular slit therebetween, means for relatively heating and cooling the inner and outer tubes to maintain a temperature gradient across each slit, a first wall connected to and supporting one end of each inner tube of a pair, a second wall spaced from said first wall and supporting one end of each outer tube corresponding to said one end of each inner tube, said second wall having openings therein for said one end of said outer tubes, said walls defining a chamber therebetween and communicating with said slits at said one end of each pair of tubes, a baffle plate interposed between said walls and having openings therein larger than and receiving said inner tubes, tubular sleeves extending from said baffle plate around said openings therein in spaced relation to said inner and outer tubes and having ends disposed in said slits in spaced relation to said tubes at said one end of said tubes, said chamber having liquid flow passages communicating therewith on opposite sides of said baffle plate, and means having ports therein communicating with said slits at the opposite ends of said pairs of tubes from said chamber.

8. A liquid thermal diffusion apparatus comprising a plurality of pairs of vertical concentric tubes, the inner tube and the outer tube of each pair having opposed walls forming a narrow annular slit therebetween, a first chamber having a wall supporting the inner tubes of each pair, said wall having openings through which the said inner tubes communicate with said first chamber, a second chamber having a wall spaced from said wall of said first chamber and supporting the outer tubes and having openings therein for the open ends of the outer tubes, a baffle plate having openings therein through which said inner tubes extend, said baffle being interposed between said walls of said first and second chambers, a plurality of tubular sleeves on said baffle plate, each being concentric with a pair of tubes and extending into the slit therebetween, and forming ports on opposite sides thereof between the inner tube and one side of said baffle plate and between the outer tube and the other side of the baffle plate, means for relatively heating and cooling the tubes by introducing heating and cooling media into said first and second chambers, and a third port communicating with the slits at the other ends of said concentric tubes.

9. Liquid thermal diffusion apparatus comprising a plurality of pairs of substantially vertical and concentric tubes, each pair of tubes having walls substantially equidistantly spaced to form a narrow annular slit therebetween, at least one end of each inner tube projecting beyond one end of the corresponding outer tube, means for relatively heating and cooling the tubes of each pair to maintain a temperature gradient across the slit therebetween, a perforated baffle plate substantially perpendicular to the tubes and supported at one end of the pairs of tubes and between the corresponding ends of the inner and outer tubes, the perforations in said plate being concentric with the inner tubes of each pair, a sleeve member extending in spaced relation to the inner and outer tubes from the perforated baffle plate to the annular slit between each pair of tubes, each sleeve member forming a first port communicating with the space between said perforated plate and the projecting end of the inner tube of each pair and a second port communicating with the space between the baffle plate and the corresponding end of the outer tube of each pair and an outlet communicating with the slits at the other ends of the pair of tubes.

References Cited in the file of this patent

UNITED STATES PATENTS

| | | |
|---|---|---|
| 2,075,353 | Mobley | Mar. 30, 1937 |
| 2,158,238 | Hvid | May 16, 1939 |
| 2,390,115 | McNitt | Dec. 4, 1945 |
| 2,521,112 | Beams | Sept. 5, 1950 |
| 2,541,069 | Jones et al. | Feb. 13, 1951 |
| 2,541,071 | Jones et al. | Feb. 13, 1951 |
| 2,585,244 | Hanson | Feb. 12, 1952 |